United States Patent [19]

Ruben et al.

[11] 3,760,409

[45] Sept. 18, 1973

[54] PROGRAMMABLE KEYBOARD AND KEYS

[75] Inventors: Murray A. Ruben, Belmont; Robert F. Collings, Stow, both of Mass.

[73] Assignee: Alan M. Voorhees, Montgomery County, Md.

[22] Filed: Nov. 17, 1971

[21] Appl. No.: 199,478

[52] U.S. Cl. ............ 340/365 S, 340/365 E, 197/98, 200/166 PC

[51] Int. Cl. ............ H04q 3/00

[58] Field of Search ............ 340/365; 179/90 K; 197/98; 200/159 R, 166 PC

[56] References Cited

UNITED STATES PATENTS

| | | | |
|---|---|---|---|
| 3,660,826 | 5/1972 | Lins | 340/166 |
| 3,623,082 | 11/1971 | Stein et al. | 340/365 |
| 3,651,463 | 3/1972 | Rawson et al. | 340/365 |
| 3,662,378 | 5/1972 | MacArthur | 340/365 |
| 3,061,816 | 10/1962 | Reynolds | 340/147 |

*Primary Examiner*—John W. Caldwell
*Assistant Examiner*—Robert J. Mooney
*Attorney*—John W. Malley et al.

[57] ABSTRACT

A programmable keyboard and key set with a plurality of matrix locations each adapted for receiving a key and each having a number of terminals. In the embodiment described below, at least four types of keys can be used, each electrically connecting one of the terminals to a different combination of terminals so that the key board can be programed by the type of key inserted at each of the matrix locations. Each matrix location is scanned sequentially by two counters with the count stopped to identify the location whenever a manually operated key is encountered. Circuitry is also included to prevent stopping the count whenever two keys are simultaneously operated.

20 Claims, 6 Drawing Figures

PATENTED SEP 18 1973

3,760,409

SHEET 2 OF 6

PROGRAMMABLE KEYBOARD AND KEYS

BRIEF DESCRIPTION OF THE PRIOR ART AND SUMMARY OF THE INVENTION

The invention relates to a programmable keyboard having a plurality of key receiving matrix locations which can be programmed according to the type of key inserted at the matrix locations.

Keyboards are widely used in many types of applications for entering information manually into a system which may then use, store or otherwise handle the data to carry out a desired function. These uses include the input of information to a computer, electronic calculators, telephones, electronic cash registers, etc. For many such applications the type of information which the individual user desires to enter into the keyboard, and the way in which that individual desires that information to be entered, may differ considerably from one user of the basic device to another. This is particularly true with respect to cash registers, including electronic cash registers, which are sold to retailers of all types of goods from foods to diamonds to clothing. Hitherto it has been the general practice to use different keyboards for different customers and to design and configure the keyboard for the particular use which a given type of user desired and with the particular data input which the user felt appropriate. This individual design effort, of course, adds considerably to the cost of the device, and further generally makes it impractical to provide many users, particularly those with limited demand, with the exact capabilities which they desire.

The present invention relates to a keyboard which can be simply and easily programmed by the insertion of one of a number of different types of keys at any of a plurality of matrix locations, each adapted for receiving a key. With respect to an electronic cash register one user may desire a group of keys which are each identified with one product, thus eliminating the necessity to enter the individual cost of the item. Another user may instead desire keys which permit entry of information regarding the category of the item whose sale is being recorded and further may desire that information to be divided into items which are taxable and items which are not taxable. All of these capabilities can be readily satisfied with the same basic matrix and matrix scanning circuitry by simply inserting different types of key and this can in fact be done at the user's facility at the time of sale. Further, the capability of the keyboard can be easily changed at any time after installation simply by removing one type of key and inserting another type of key, thus lending even further flexibility to the system.

In the specific embodiment described in detail below, each of the matrix locations includes first, second, third and fourth electrical terminals. A plurality of first electrical connectors each connect to a number of the first terminals while a second group of electrical connectors each connect to a number of second terminals so that each matrix location has connected to it one of the first group of connectors and one of the second groups of connectors, and is uniquely identified in the matrix thereby. A pulse generating circuitry generates pulses which are applied to a conventional counter which increments the count therein upon receipt of each pulse and is connected to a selector circuitry which sequentially enables each of the connectors of the first group of connectors as a function of the count in the first counter which is driven in a cycle on which each of the first connectors is enabled.

A second counter is connected to the first counter and is incremented once for each cycle of the first counter. The second counter in turn is electrically coupled to the second group of connectors to apply a signal to each of these in sequence. If a signal is applied to one of the second group of connectors and that connector is connected to the second terminal of a matrix location at which a key has been manually operated, when the connector of the first group of connectors is enabled the selector circuitry produces an output which is applied to a conventional logic gate which is in turn connected to the pulse generating circuitry to disable the same upon the encounter of an operated key, so that the count in the first and second counters is frozen, reflecting the location of the operated key.

The output of the gating circuitry is also applied to a flag flip-flop to cause that flip-flop to change condition and produce an output signal which indicates to other circuitry which, for example, may control an electronic calculator, that a key has been manually operated and information is available for transfer to that other circuitry. A plurality of flip-flops also connect to the third and fourth terminals of the matrix location, and these flip-flops change condition whenever the type of key which has been operated electrically connects to the second or third terminals, respectively. In this fashion, the type of key which is inserted at the encountered location is made known to the circuitry which receives the information from the keyboard.

According to a further aspect of the invention, circuitry is employed between the first group of connectors and the flag flip-flop-and pulse producing circuitry to prevent the freezing of the counters and the setting of the flag flip-flop if two or more keys are simultaneously operated. In the embodiment described in detail below, a transistor is connected to each of the connectors of the first group of connectors via a resistor so that the transistor shifts from a first to a second output condition, for example, non-conductive to conductive whenever two or more keys are depressed, and accordingly the resistance applied to the base terminal of the transistor drops to a value sufficient to cause it to shift its output condition. This shift produces a signal which is applied to a logic gate which connects the output of the selector circuitry to the pulse producing means and the flag flip-flop such that no signal is thus transmitted and accordingly the scanning circuit does not stop.

Many other objects and purposes of the invention will become clear from the following detailed description of the drawings.

DETAILED DESCRIPTION OF THE DRAWINGS

Figure 1:
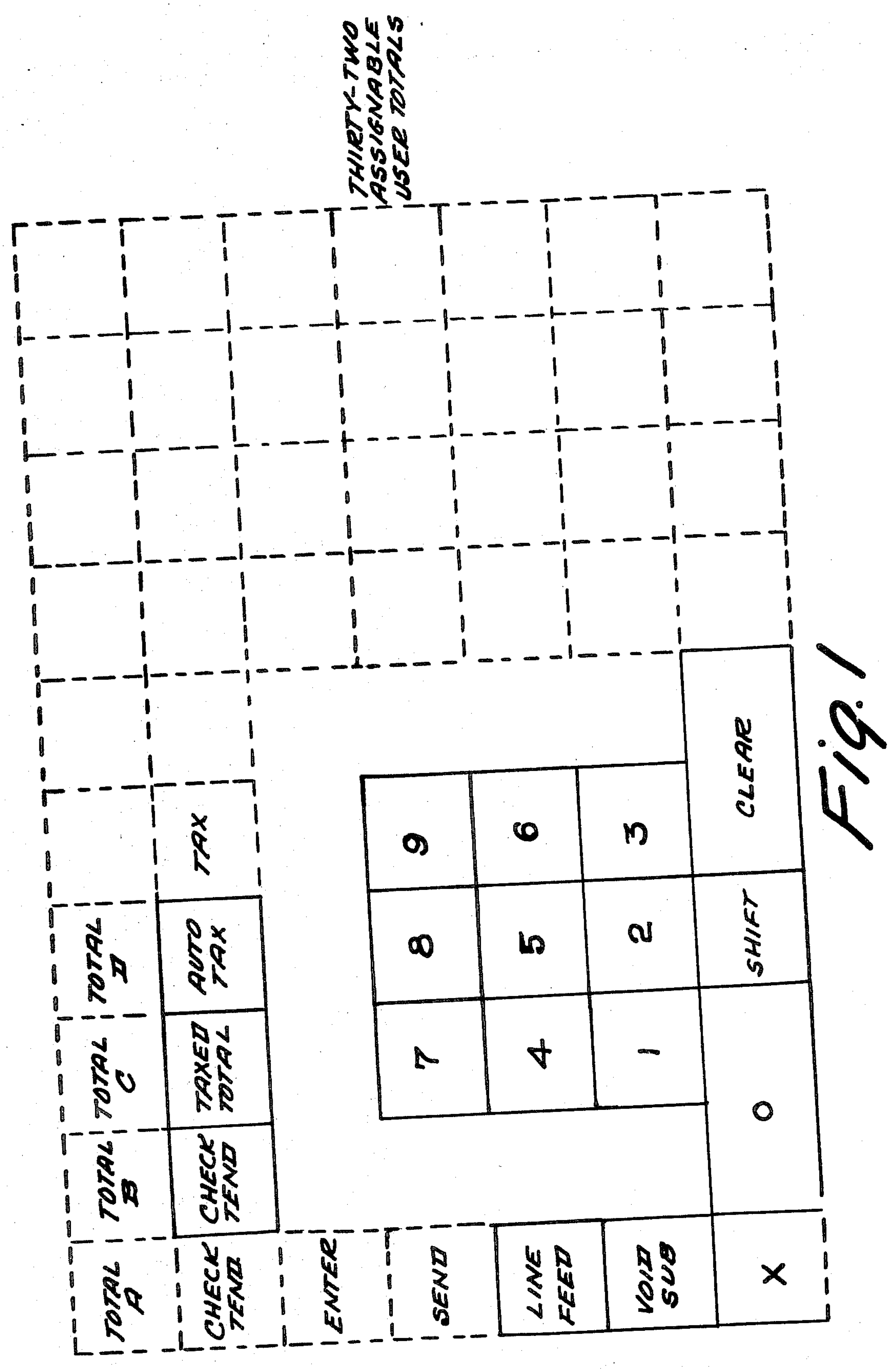
FIG. 1 shows a schematic view of a keyboard suitable for use with an electronic cash register.
Figure 2A:
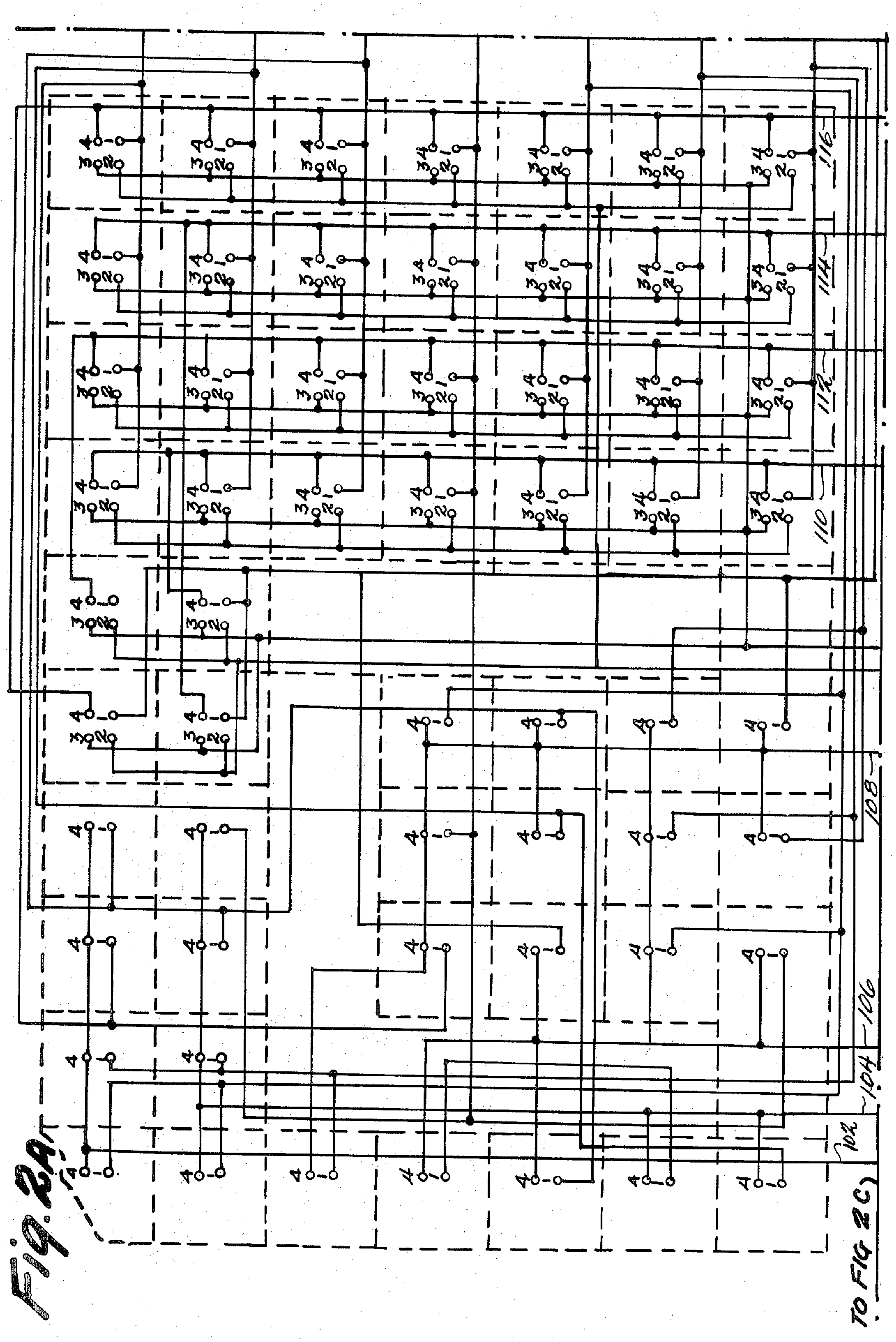
FIGS. 2*a* through 2*d* show a detailed schematic of the keyboard circuitry which receives the information entered by manual operation of the keys and determines the location and the type of a manually operated key.
Figure 2B:
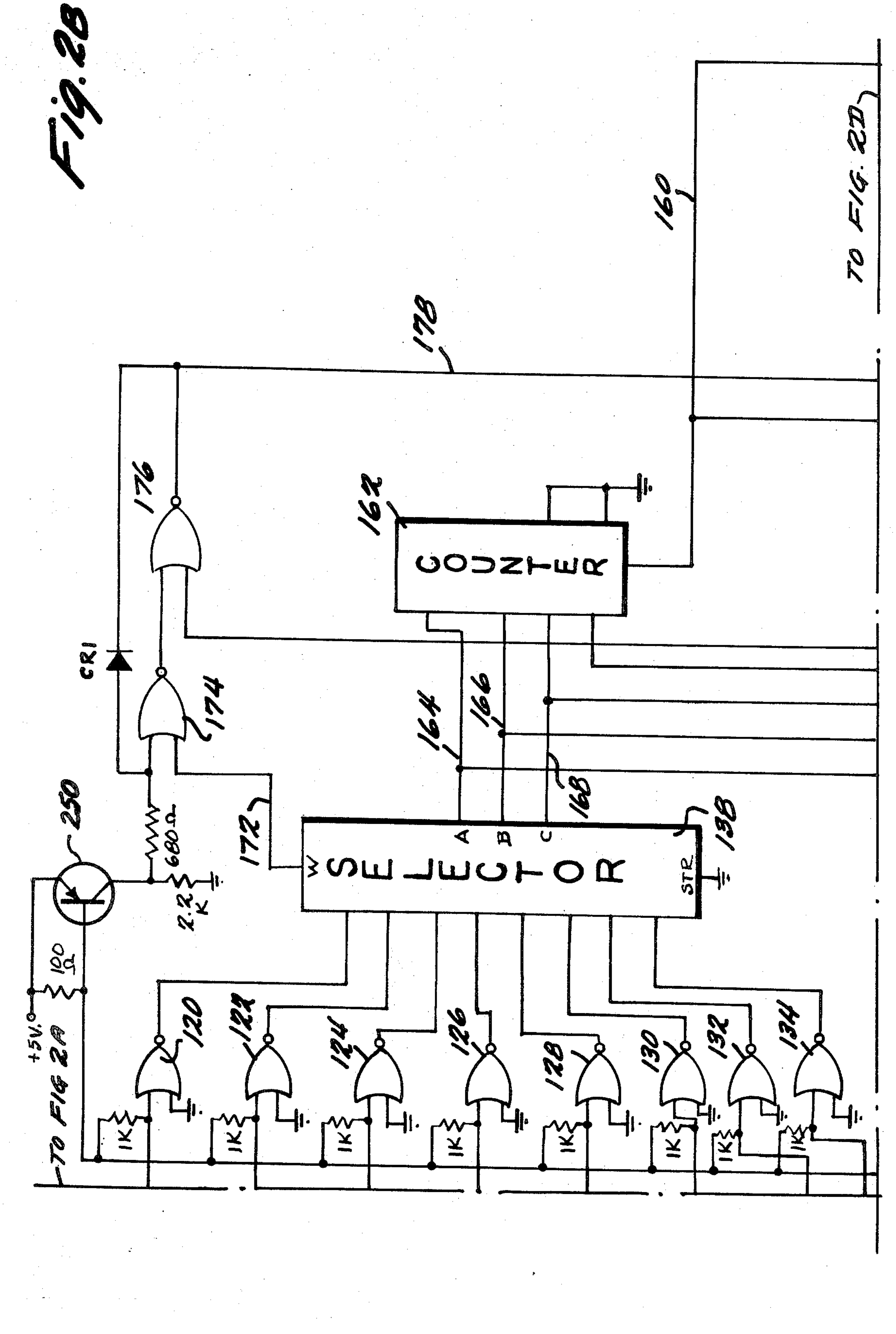
Figure 2C:
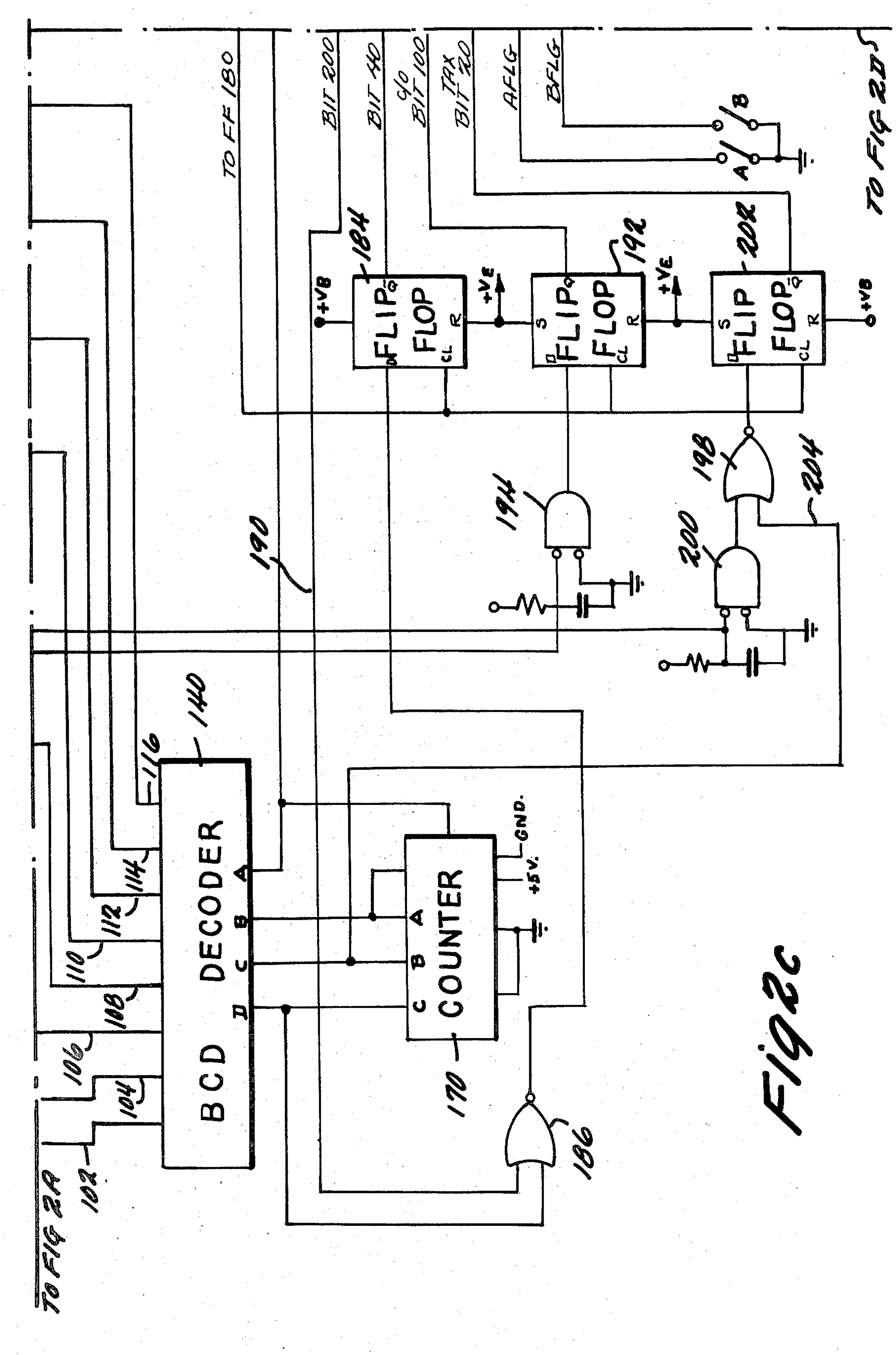
Figure 2D:
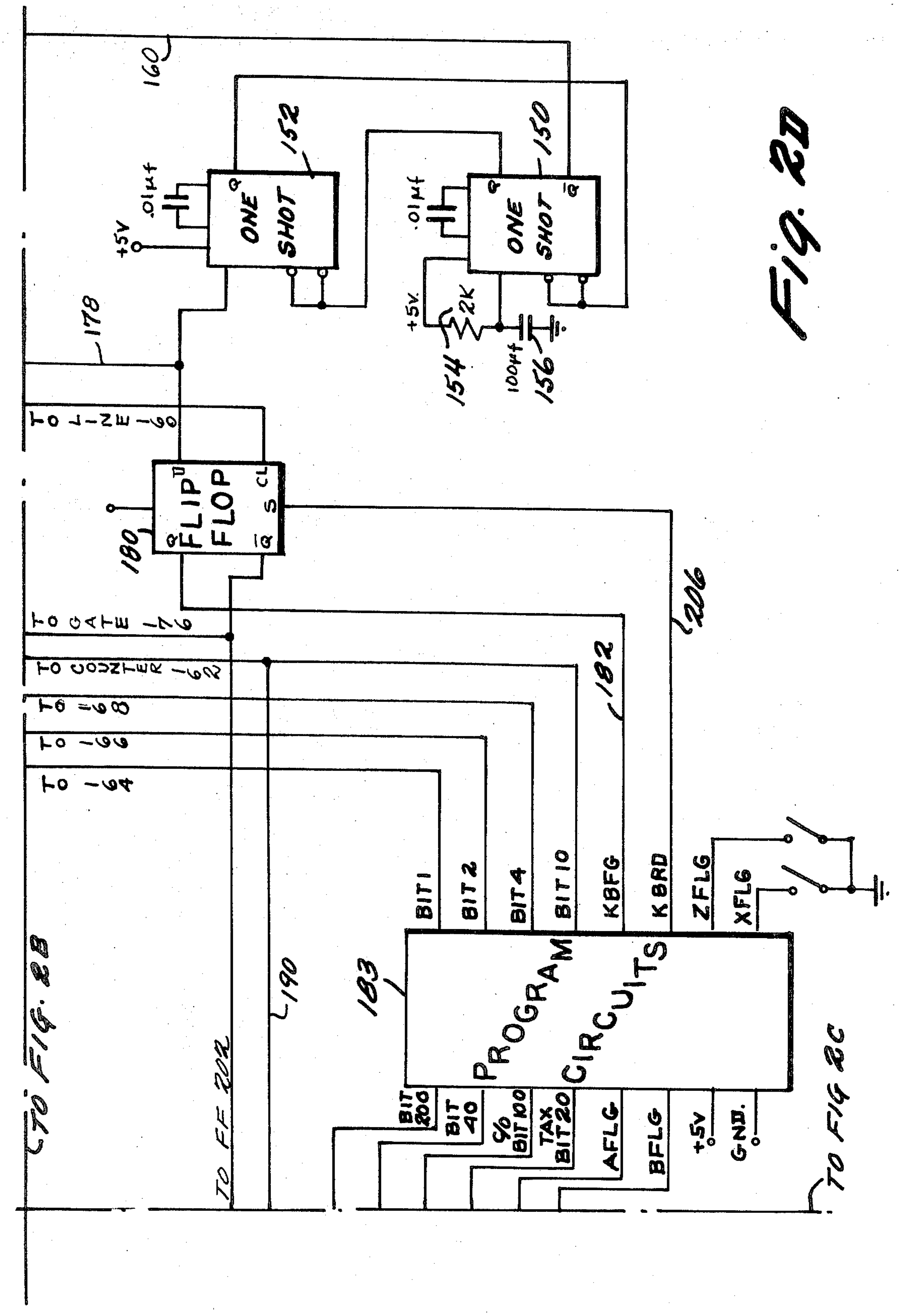

Reference is now made to FIG. 1 which shows a schematic of a keyboard layout designed to be used with an electronic cash register. That cash register is described in greater deail in a co-pending application, Ser. No. 199,685, filed on this day, entitled "Electronic Cash Register" and the disclosure of that application is explicitly incorporated herein by reference. It should be further understood that while the novel keyboard and keys of this invention have particular utility in connection with that electronic cash register, there is no intention to limit the invention to that usage, and it should be apparent that the broad concepts as described below find application in many other types of keyboard, and permit such keyboards to be readily and simply programmed simply by the insertion of different types of keys.

The keyboard layout of FIG. 1 includes, as shown, a number of keys which are intended to enter numerical information, for example, the price of an item which is being purchased and totalled or the number of such items. Four employee keys are also included for permitting the entry of information with respect to the individual who is recording the sale. A paper feed key is employed to advance a paper tape on which a record of the transaction or the like is produced. The X key, as described in greater detail in the above mentioned co-pending application is used for multiplication of the price of an item and the number of the items, both being entered on the numerical keys. The void key can be depressed to cause a transaction just entered to be subtracted from the total and voided. At the end of information entry, the operator hits the tax total key which causes the display of the taxable sub-total on an indicator. The tax amount can be calculated by the machine using the auto-tax key, or numerically entered using the tax key, and a total key operated to display the the total amount due from the transaction. Next the operator enters the amount tendered in the numerical part of the keyboard and operates the cash tendered key, the check tendered key or other key which has been added to indicate a certain type of charge, etc. The system then preferably calculates the change and displays the same. Operation of the cash or check tendered key also causes the drawer to be opened for returning the change to the customer.

The send and enter keys permit the keyboard to be tied into a communication system to a computer or the like. Information entered and appearing on the indicator can also be cleared by the operation of the clear keyboard key.

The matrix locations of the keyboard which are not indicated as used in the schematic of FIG. 1 can be employed to receive keys of different types to program and configure the keyboard as desired, and in fact the type of keys shown can be substituted for other keys if that is found desirable. Some of the keys to be added would normally identify the category of goods which are being purchased, for example, clothes, food, etc., and the proper category key would normally be operated after entry of the numerical information to cause that information to be added to the appropriate total and clear the keyboard for the entry of the next item. These category keys are normally either taxable keys or non-taxable keys depending on the type of item involved. If a taxable key is operated then the numerical cost is added to the taxable total and similarly if a category key associated with a non-taxable item is operated the numerical information is not added to the taxable total.

Alternatively, keys can be added to keyboard which are associated with a pre-set amount and which would normally be labelled to identify the item, for example, Hamburger, French Fries, Roast Beef, etc. Operation of this type of key would automatically indicate to the system that the price of that item as programmed into the system should automatically be added to the appropriate total — taxable or non-taxable. Accordingly, depending on the type of key which is added to the system, the keyboard can be individually configured and programmed in accordance with the wants and desires of the user.

Figure 3:
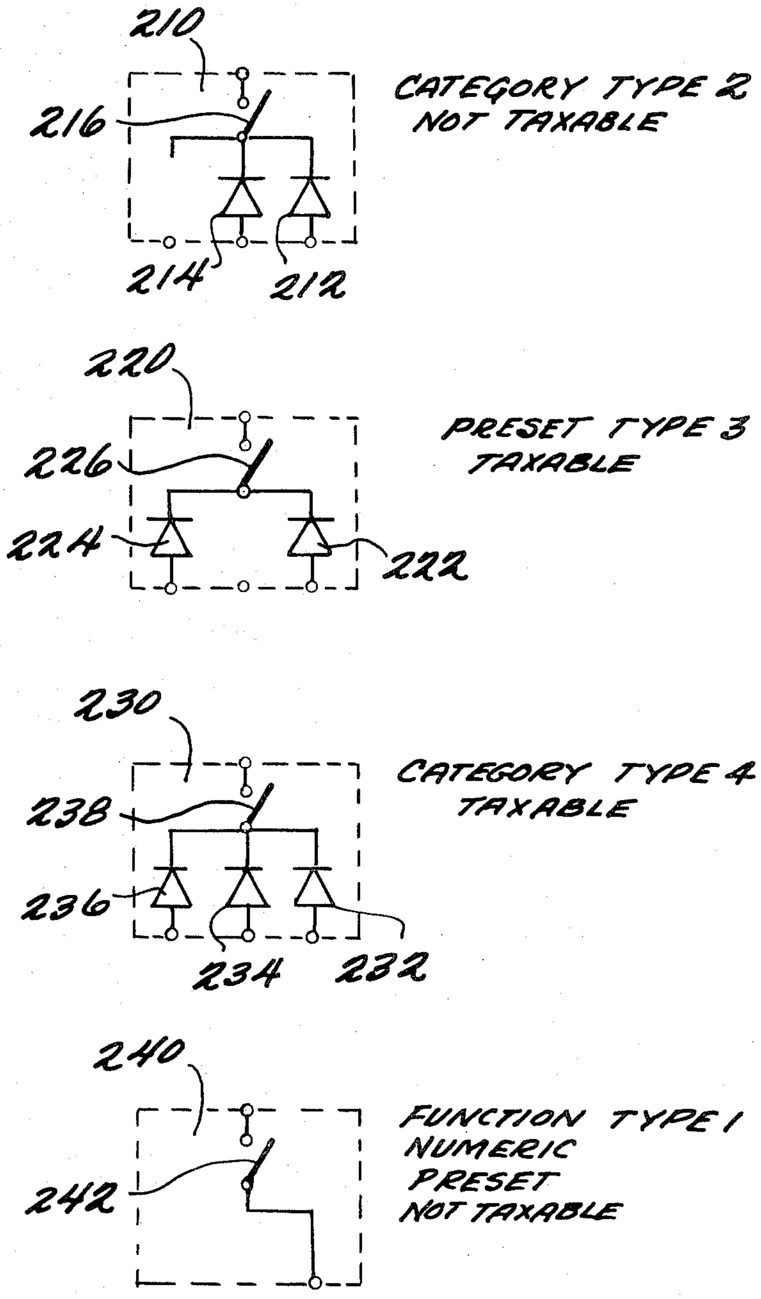
FIG. 3 shows four types of keys which can be employed in the specific embodiment shown in FIG. 2.

Refering to FIG. 2, which shows a detailed schematic of the keyboard circuitry, there are 64 matrix locations in the specific embodiment described in this application, each adapted for receiving one key of one of the types shown in FIG. 3. Those matrix locations which are intended to receive more than one type of key have associated with them four electrical terminals — terminal one, terminal two, terminal three and terminal four. Those matrix locations which are not expected to be used to receive more than one type of key have only terminals one and four as shown, but it will be appreciated that the four terminal matrix locations could be used at each of the matrix locations if it were desired to be able to program at every possible matrix location. It will be further understood that the size of the matrix can be expanded as desired to produce a keyboard which has all the possible locations for keys which might be needed to enter information in any given application. It should be further noted that not each possible matrix location in the embodiment shown in FIG. 2 is employed, but all such locations could be employed if desired.

Each of the terminals labeled terminal 4 at the matrix locations shown in FIG. 2 is connected to lines 102, 104, 106, 108, 110, 112, 114, and 116 as shown, these lines defining a group of connectors with each conector connecting to a plurality of matrix locations and more particularly to a fourth terminal thereof. Similarly, a further group of connectors each connect to a number of matrix locations and more particularly to the first terminal thereof, and to buffer gates 120, 122, 124, 126, 128, 130, 132 and 134 with the outputs of these gates in turn being connected to selector circuitry 138. It should be noted that no two of the matrix locations which connect to any one of the lines which connect to the binary to decimal coder 140 connect to the same one of the group of connectors which are applied to buffer gates 120, 122, 124, 126, 128, 130, 132 and 134.

One-shots 150 and 152 together with resistor 154 and capacitor 156 comprise a conventional oscillator circuit which produces a train of pulses on line 160 which are applied to conventional counter 162 to cause that counter to be incremented once for each pulse applied, and to count through a complete cycle and then begin anew. The output of counter 162 is applied on lines 164, 166 and 168 to conventional selector circuitry 138 which enable one of the lines connecting gate 120, 122, 124, 126, 128, 130, 132, or 134 to selector 138 with each line being sequentially enabled one at a time as a function of the output of counter 162.

Similarly, counter 162 is connected as shown to a further counter 170 which is incremented once for each cycle of counter 162. The output of counter 170 is applied to the binary to decimal decoder 140 to sequentially apply an electrical signal to lines 102, 104, 106,

108, 110, 112, 114 and 116. When the signal applied to one of these electrically connected to one of the amplifiers 120, 122, 124, 126, 128, 130, 132 or 134 by a manually operated key of the type shown in FIG. 3, and further that connector is enabled by selector 138, a signal is produced on line 172 causing gate 174 to shift its output condition, in turn causing gate 172 to shift its output condition and apply a signal on line 178 which disables the pulse generator comprised of flip-flops 150 and 152 and to thus freeze the count in counters 162 and 170, that count indicating the location of the operated key. This signal further causes flag flip-flop 180 to shift its output condition and produce a flag signal on line 182 which indicates to the program circuits 183 which receive the information from the keyboard that a key has been operated and information is now available for entry into the program circuits. The outputs of counter 162 on lines 164, 166, 168 are connected to the program circuits as shown which can thus sample the count therein. The shifting of flip-flop 180 in addition clocks flip-flops 184, 192 and 202 and locks the output of gate 176 low to prevent scanning until flip-flop 180 is set as discussed below.

Further, flip-flop 184 which serves as an inverting counter is connected via gate 186 to two outputs to counter 170 and a third output is connected to program circuits 183 via line 190. Flip-flop 192 is connected via gate 194 to the terminals 2 of each of the matrix locations such that this flip-flop is set if the key that was manually operated had an electrical connection between the fourth terminal and the second terminal. As will be apparent from the discussion below, in this specific embodiment of the invention such a connection means that the key operated was a Category key identifying a specific category of merchandise. The output of flip-flop 192 is connected to program circuits 183 on line 196.

Terminals 3 at the matrix locations are similarly connected to gate 198 via gate 200 to cause flip-flop 202 to shift its output condition if there was an electrical connection between the fourth and third terminals. As will be apparent from the discussion below, such a connection in this specific embodiment means that the key operated is associated with a taxable item. An output of counter 170 is also connected as an input to gate 190 on line 204 and, because only half of the matrix location in the embodiment shown in FIG. 2 are available to receive different types of keys, the receipt of a signal on line 2 or line 3 automatically identifies the operating key as being among that half.

When the program circuitry has received the information, a flag clear signal is produced on line 206 to set flip-flop 180 which permits the oscillator comprised of flip-flops 150 and 152 to resume producing its output pulse train and incrementing the count in counters 162 and 170 so that the scanning continues until a further operated key is encountered. In this embodiment, the entire matrix is scanned in about 3 milli-seconds.

These switches labelled A, B, X and Z are also manually operable to indicate certain information such as the cash drawer which is being used or the mode in which the cash register is to operate.

Reference is now made to FIG. 3 which shows four types of keys which can be inserted in the matrix locations shown in FIG. 3. Key 210 is intended to be a category, non-taxable key and includes diodes 212 and 214 connected betwen the switch 216 which is closed by manual operation of key 210, and the terminals 1 and 2. Similarly, preset taxable key 220 includes diodes 222 and 224 which connect terminals 1 and terminal 3 to switch 226. Key 230 which is a category taxable key, includes diodes 232, 234 and 236 connecting terminals 1, 2 and 3 respectively to switch 238. Key 240 which represents a function, numeric or pre-set non-taxable switch simply includes a switch 242 connecting terminal 4 to terminal 1. The matrix shown in FIG. 2 can thus be simply and easily programmed by the insetion of whichever type of key is desired.

According to a further aspect of the invention, the circuitry shown in FIG. 2 prevents the entry of information if two or more keys are simultaneously depressed. As shown, a transistor 250 is connected to each of the first terminals of the matrix locations by a suitable resistor having a value such that if two or more keys are simultaneously operated, the voltage at the base of transistor 250 shifts such as to change the output condition of that transistor which in turn applies a blocking signal to gate 174 which prevents selector 138 from applying a signal to gate 176 to cause that gate to change the output condition of the flag flip-flop 180 and disable the pulse producing generator comprised of flip-flops 150 and 152. The other input to gate 176 is connected to an output to flag flip-flop 180 such that gate 176 is permanently locked low by flag flip-flop 180 to keep the pulse generating circuitry comprised of flip-flops 150 and 152 disabled until the program circuitry has set the flag flip-flop 180 and permitted the scanning to resume.

Many changes and modifications in the above embodiment of the invention can, of course, be made without departing from the scope of the invention and accordingly, that scope is intended to be limited only by the scope of the appended claims.

What is claimed is

1. A programmable keyboard comprising:

means defining a plurality of physically separated matrix location structures having means for receiving a key and each having means for displaying a first electrical condition when a first type of key is inserted in that location and a second electrical condition when a second type of key is inserted, a plurality of manually operable keys each inserted at one of said matrix locations, means electrically connected to each of said matrix locations defining means for checking said matrix locations and producing a signal indicating the location of a matrix location when the key inserted in that matrix is manually operated, means electrically connected to said matrix locations defining means for producing a first electrical signal when a key inserted in a matrix location is manually operated and that matrix location is in said first electrical condition and a second electrical signal when a key inserted in a matrix location is manually operated and that matrix location is in said second condition.

2. A keyboard as in claim 1 wherein said matrix locations defining means includes a plurality of electrical terminals at each said matrix location, and wherein each said key includes means for electrically connecting a first one of said terminals at the matrix location at which it is inserted to a second one of said terminals at the matrix location at which it is inserted when that key is manually operated.

3. A keyboard as in claim 2 wherein at least one of said keys further includes means for electrically connecting said first terminal to a third one of said terminals at the matrix location at which it is inserted when that key is manually operated.

4. A keyboard as in claim 3 wherein said first to third terminal connecting means is a diode.

5. A keyboard as in claim 3 wherein at least a further one of said keys includes means for electrically connecting said first terminal to a fourth one of said terminals at the matrix location at which it is inserted when that key is manually operated.

6. A keyboard as in claim 3 wherein at least a further one of said keys includes means for electrically connecting said first terminal to said third terminal at the matrix location at which it is inserted when that key is manually operated and means for electrically connecting said first terminal to a fourth of said terminals at the matrix location at which it is inserted when that key is manually operated.

7. A keyboard as in claim 2 wherein said checking means includes means for sequentially checking each of said matrix locations.

8. A keyboard as in claim 7 wherein said sequentially checking means includes means for producing a pulse train, first counter means connected to said pulse producing means for receiving and counting the pulses in a cycle and producing an output indicating the count therein, a first plurality of electrical connectors each connecting to the first terminals of a first set of matrix locations, selector means connected to said first counter means and to said first plurality of electrical connectors for sequentially enabling one at a time each of said connectors of said first plurality of connectors with each connector enabled upon a different count in said counter means, a second plurality of conductors each connecting to the second terminals of a second set of matrix locations each having a first terminal connected to a different one of said first plurality of conductors, second counter means connected to said first counter means for counting the cycles of said first counter means and producing an output indicating the count therein, means connecting said second counter means to said second plurality of connectors for sequentially applying a signal to each of said connectors of said second plurality one at a time so that when a signal is applied to one of said second plurality of connectors and a key at one of the matrix locations connected to that connector the connector of the first plurality of connectors is received, said signal via said first and second terminals at that location and means for disabling said pulse train producing means when one of said first plurality of connectors is both enabled and receives said signal.

9. A keyboard as in claim 8 further including a flag flip-flop, means connecting said flip-flop to said selector means for causing said flip-flop to shift from a first to second output condition when one of said first plurality of connectors is both enabled and receives said signal.

10. A keyboard as in claim 9 further including means connected to said causing means and to each of said connectors of said first plurality of connectors for preventing said causing means from causing said flip-flop to shift from said first to said second condition when two of said keys are manually operated simultaneously.

11. A keyboard as in claim 10 wherein said causing means includes logic gate means connecting said selector means to said flag flip-flop for applying a condition changing signal to said flag flip-flop wherein said preventing means includes electronic switching means, resistive means connecting said switching means to said connectors of said first plurality of connectors so that said switching means shifts from a first to second condition when two of said keys are manually operated and means connecting said switching means to said gate means to prevent said gate means for applying said condition changing signal to said flag flip-flop when said switching means is in its second condition.

12. A keyboard as in claim 8 wherein at least one of said keys further includes means for electrically connecting said first terminal to a third one of said terminals at the matrix location at which it is inserted when that key is manually operated, and including flip-flop means connected to said third terminals at said matrix locations for shifting from a first to second electrical condition when one of said keys having means connecting the first to the third terminal is manually operated.

13. A manually operable programming key for a programmable keyboard comprising:

a first terminal, a plurality of second terminals, switching means connected to said first terminal for shifting from a first to a second electrical condition when said key is manually operated, and means connecting at least two of said second terminals to said switching means.

14. A key as in claim 13 wherein said connecting means includes first and second diodes.

15. A programmable keyboard comprising:

means defining a plurality of matrix locations, each adapted for receiving a key, a plurality of manually operable keys each inserted at one of said matrix locations, means electrically connected to said matrix locations defining means for checking said matrix locations and producing a signal indicating a matrix location when the key inserted in that matrix is manually operated, and means for preventing said checking and producing means from producing said signal when two or more of said keys are manually operated simultaneously.

16. A keyboard as in claim 15 wherein said checking means includes means for sequentially checking each of said matrix locations.

17. A keyboard as in claim 16 wherein said matrix locations defining means includes a plurality of electrical terminals at each said matrix location, and wherein each said key includes means for electrically connecting a first one of said terminals at the matrix location at which it is inserted to a second one of said terminals at the matrix location at which it is inserted when that key is manually operated where said sequentially checking means includes means for producing a pulse train, first counter means connected to said pulse producing means for receiving and counting the pulses in a cycle and producing an output indicating the count therein, a first plurality of electrical connectors each connecting to the first terminals of a first set of matrix locations selector means connected to said first counter means and to said first plurality of electrical connectors for sequentially enabling one at a time each of said connectors of said first plurality of connectors with each connector enabled upon a different count in said counter means, a second plurality of conductors each connecting to the second terminals of a second set of matrix locations each having a first terminal connected to a different one of said first plurality of conductors, second counter means connected to said first counter means for counting the cycles of said first counter means and producing an output indicating the count therein, means connecting said second counter means to said second plurality of connectors for sequentially applying a signal to each of said connectors of said second plurality one at a time so that when a signal is applied to one of said second plurality of connectors and a key at one of the matrix locations connected to that connector the connector of the first plurality of connectors is received, said signal via said first and second terminals at that location and means for disabling said pulse train producing means when one of said first plurality of connectors is both enabled and receives said signal.

18. A keyboard as in claim 17 further including a flag flip-flop, means connecting said flip-flop to said selector means for causing said flip-flop to shift from a first to second output condition when one of said first plurality of connectors is both enabled and receives said signal.

19. A keyboard as in claim 18 further including means connected to said causing means and to each of said connectors of said first plurality of connectors for preventing said causing means from causing said flip-flop to shift from said first to said second condition when two of said keys are manually operated simultaneously.

20. A keyboard as in claim 19 wherein said causing means includes logic gate means connecting said selector means to said flag flip-flop for applying a condition changing signal to said flag flip-flop wherein said preventing means includes electronic switching means, resistive means connecting said switching means to said connectors of said first plurality of connectors so that said switching means shifts from a first to second condition when two of said keys are manually operated and means connecting said switching means to said gate means to prevent said gate means from applying said condition changing signal to said flag flip-flop when said switching means is in its second condition.

* * * * *